Sept. 25, 1962      S. J. SPIECE      3,055,968

CONDENSER BUSHING

Filed Dec. 14, 1960

INVENTOR.
Stanley J. Spiece
BY Lee N. Kaiser
Attorney

United States Patent Office 3,055,968
Patented Sept. 25, 1962

3,055,968
CONDENSER BUSHING
Stanley J. Spiece, Milwaukee, Wis., assignor to McGraw-Edison Company, Milwaukee, Wis., a corporation of Delaware
Filed Dec. 14, 1960, Ser. No. 75,786
7 Claims. (Cl. 174—31)

This invention relates to electrical insulating bushings and more particularly to high voltage, dielectric-fluid-filled condenser bushings for carrying high voltage leads through the walls of electrical apparatus.

High voltage, oil-filled condenser bushings are commonly employed on stationary induction apparatus, circuit breakers, reclosers and related apparatus to carry high voltage leads through an apparatus casing wall which is at ground potential. A central conductor stud conventionally extends axially through the bushing, and an insulating core comprising a plurality of radially spaced cylinders of dielectric-fluid-impregnated insulating material interleaved with condenser foil equalizer layers wrapped around the central conductor stud to grade the voltage through the insulating core so that no portion thereof will be unduly electrically stressed. The length of the condenser foil equalizer layers preferably increases toward the central conductor in order to provide the most desirable configuration for the electrostatic field surrounding the central conductor. A metallic ground sleeve, which may be electrically connected to the radially outer condenser foil, is conventionally shrunk onto the central portion of the insulating core. A metallic mounting flange is affixed to the ground sleeve, and top and bottom ceramic shells separated by the ground sleeve and the mounting flange surround the insulating core and central conductor stud and provide means for retaining the dielectric fluid. A top terminal at the upper end of the top ceramic shell is electrically connected to the central conductor stud, and a lower cap is provided to seal the lower end of the bottom ceramic shell.

The top and bottom ceramic shells define upper and lower annular chambers surrounding the insulating core and filled with suitable dielectric liquid. The ceramic shells and dielectric liquid improve dielectric strength and thus reduce electrical stress and radio influence voltage in comparison to bushings wherein the lower ceramic shell is omitted. However, the upper ceramic shell must be provided with gaskets where it joins the top terminal and the mounting flange, and the lower ceramic shell similarly must be provided with gaskets where it joins the ground sleeve and the lower cap, and caution must be taken during assembly that the various parts and gaskets are accurately aligned. Although such bushings function satisfactorily, they are extremely costly to manufacture.

It is an object of the invention to provide a high voltage, fluid-dielectric-filled condenser bushing having low radio influence voltage which is much cheaper to manufacture than prior art bushings.

It is a further object of the invention to provide such a high voltage, radio-noise-free, fluid-dielectric-filled condenser bushing without a separate metallic mounting flange member, without a separate metallic grounding sleeve member, and without gaskets at the lower end of the upper ceramic shell and at the upper end of the lower ceramic shell.

Another object of the invention is to provide a condenser bushing having improved means for making electrical connection between the outer conductive layer of the condenser core and the ground sleeve surrounding it.

Briefly stated, the preferred embodiment of high voltage, radio-noise-free condenser bushing of the invention includes upper and lower ceramic shells having abutting radial flanges united to provide the mounting flange of an all-porcelain tubular housing surrounding a central axial conductor having alternate layers of dielectric and conducting material wrapped thereon to form the condenser core. Portions of the ceramic shells which were in the form of separate metallic members in prior art bushings are covered with a highly conductive coating before the upper and lower ceramic shells are cemented together. In the preferred embodiment, at least the inner periphery of the lower ceramic shell, the surface of the lower ceramic shell which abuts against the upper shell, and the surface of the circumferential flange on the lower shell are coated with metal to provide ground sleeve means and to afford electrical connection from the ground sleeve means interior of the ceramic housing to the metal-coated mounting flange which rests upon and is electrically connected to the grounded metal wall of the electrical apparatus. The radially outer layer of condenser foil in the insulating core is preferably electrically connected by a plurality of circumferentially spaced apart, resilient, metallic contact fingers to the metallic ground sleeve.

The invention will be better understood from the following detailed description taken in conjunction with the accompanying drawing wherein.

Figure 1:
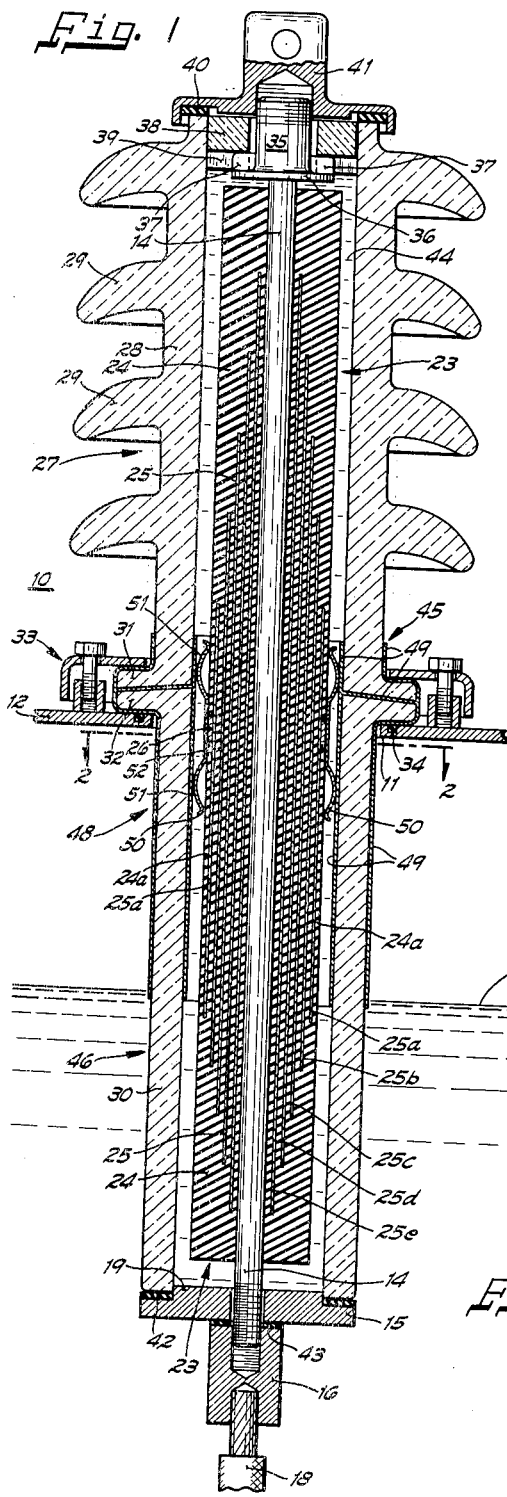
FIG. 1 is a vertical cross sectional view through a preferred embodiment of the invention.
Figure 2:
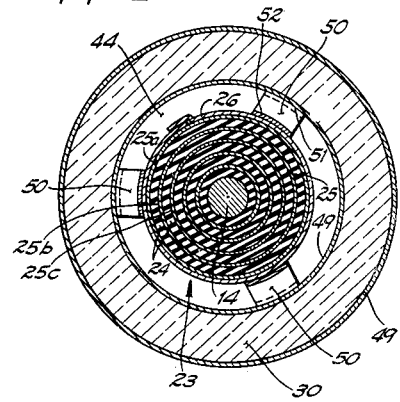
FIG. 2 is a horizontal sectional view through the preferred embodiment showing the improved resilient metallic contact finger means for making electrical connection between the outer foil layer of the condenser core and the ground sleeve.

Referring now to the drawing, a high voltage condenser bushing 10 embodying the invention is illustrated as extending through an aperture 11 in a metallic wall 12 of an electrical transformer casing which may be at ground potential. A central conductor stud 14, which may be hollow, extends axially through the bushing 10. The lower end of the central conductor stud 14 is threaded and extends through an axial aperture in a lower cap 15 and engages a lower metallic terminal member 16 which is electrically connected to a transformer primary winding lead 18. Lower cap 15 has a reduced diameter portion 19 forming a circumferential shoulder which fits within the axial bore in bushing 10 and retains the lower end of stud 14 axial of the bushing.

A condenser core 23 comprising alternate layers of fluid-permeable insulating dielectric material 24 and thin, conductive metallic foil 25 surrounds the central conductor stud 14. The cylindrical insulating layers 24 alternating with the conducting equalizer layers 25 in effect constitute a series of concentric capacitors which grade the voltage through the insulation of the condenser core 23 so that no portion thereof will be unduly stressed electrically. The conductor stud 14 may first be wrapped with dielectric sheet material such as thin kraft paper to form the innermost cylindrical layer 24 of dielectric. A thin conducting metallic foil 25 is then applied to the insulating layer 24, and successive layers of insulating dielectric material 24 and metal foil 25 are then wrapped to obtain the desired dielectric properties.

The axial length of successive metallic foil equalizer layers 25a, 25b, 25c, etc. preferably increase in a direction toward the central conductor stud 14 to provide the most desirable configuration for the electrostatic field surrounding the central conductor stud 14. A thin metallic tab 26 of highly conductive material such as copper is inserted adjacent the radially outer condenser foil 25a and is wrapped in at least one whole turn so that its ends overlap. The overlapped ends of metallic tab 26 are soldered together to prevent unwrapping of the layers 24 and 25. The radially outer dielectric wrapping 24a has a portion cut out to accommodate the metal tab 26, and the end of dielectric layer 24a is cemented to the adjacent dielectric turn to prevent the layers 24 and 25 from unwrapping.

A two-piece, weatherproof ceramic housing 27 surrounding the central conductor stud 14 and condenser core 23 comprises an upper porcelain shell 28 at the upper end of the bushing 10 provided with one or more petticoats 29 therealong to increase the surface flashover distance and a lower tubular porcelain shell 30 at the lower end of the bushing coaxial with and abutting against the upper ceramic shell 28. Upper and lower porcelain members 28 and 30 have radially outward extending circumferential flanges 31 and 32 at their lower and upper ends, respectively, which are cemented together in abutting relation with a suitable adhesive such as epoxy resin to form a mounting flange for bushing 10. The lower surface of flange 32 rests upon the transformer casing wall 12, and the mounting flange is secured to wall 12 by conventional transformer bushing clamping means 33 to support the bushing 10 on the transformer casing with a suitable gasket 34 therebetween compressed within an annular groove in the wall 12 surrounding aperture 11.

A reduced diameter portion on the upper end of central stud 14 fits within an axial compartment in a forged metallic connector 35 and is affixed thereto by suitable means such as solder. Forged connector 35 has a circumferential flange 36 adjacent the lower end thereof and a pair of diametrically opposed, upwardly extending ears 37.

A tubular porcelain member 38 positioned within the axial bore at the upper end of porcelain shell 28 is affixed thereto by firing. Tubular porcelain member 38 has a pair of diametrically opposed notches 39 in the lower annular surface thereof. When the assembled stud 14 and forged connector 35 are inserted into the axial bore from the lower end of bushing 10, the ears 37 on forged member 35 fit within the notches 39 in porcelain member 38 to prevent turning of forged connector 35 and stud 14 when flange 36 is positioned against the bottom surface of tubular porcelain 38.

The upper end of forged connector 35 is threaded and extends beyond the top surface of upper porcelain shell 28. A suitable gasket 40 interposed between the top surface of upper porcelain shell 28 and a metallic terminal cap 41 threaded onto the end of forged connector 35 is compressed when the terminal cap is tightened and seals the upper end of porcelain housing 27 against leakage of dielectric fluid. Suitable gaskets 42 and 43 interposed, respectively, between the bottom surface of the lower porcelain shell 30 and the lower cap 15 and between the lower cap 15 and the lower terminal member 16 seal the lower end of the porcelain housing 27. A suitable insulating dielectric fluid 44 such as mineral oil fills the porcelain housing 27 and impregnates the condenser body 23 to improve dielectric strength and reduce radio influence noise generated by the bushing.

The upper porcelain shell 28 including the petticoats 29 are glazed except for the lower extremity 45 thereof, leaving the inner periphery, the outer periphery, the bottom surface, and the circumferential flange 31 unglazed at the lower extremity 45. The lower portion 46 of the lower ceramic shell 30 which extends into the oil 47 within the transformer casing is also glazed, leaving the inner periphery, the outer periphery, the circumferential flange 32 and the upper surface of the upper portion 48 of the lower ceramic shell 30 unglazed. Conductive material is then coated on these unglazed portions of the upper and lower porcelain shells 28 and 30. The conductive coating 49 may be a sprayed coating of silver, copper or other electrically conducting material and may be deposited in any of a number of different ways, as, for example, by the well known metal spray process. After the upper and lower porcelain shells 28 and 30 are sprayed with metallic coating 49, the shells are cemented together with the circumferential flanges 31 and 32 in abutting relation to form the tubular housing 27 for the dielectric fluid 44.

The metallic coating 49 and porcelain shells 28 and 30 provide both the ground sleeve means and the metallic mounting flange of prior art bushings, and the metallic coating also affords electrical connection between the ground sleeve means interior of the housing and the metal-coated mounting flange.

In the assembled bushing 10, a plurality of elongated, resilient, metallic spring contacts, or fingers 50 arranged in circumferentially spaced apart relation around the outer periphery of core 23 and between the core 23 and the ground sleeve conductive coating 49 electrically connect the outer foil 25a of condenser core 23 to the grounded transformer casing wall 12. Preferably three contact fingers 50 are utilized. Each contact finger 50 has curved portions 51 at its ends connected by a central flat portion 52 which is soldered to metallic tab 26 before the assembled core 23 and stud 14 are inserted into the bore in tubular housing 27. The resilient curved portions 51 of the contact fingers 50 are deflected when the assembly of core 23 and stud 14 is inserted into the bore in housing 27 and provide high contact pressure against the grounding sleeve coating 49 on the interior peripheral surface of porcelain shells 28 and 30.

After the assembled stud 14, core 23, tab 26, and contact fingers 50 are inserted into the bore in housing 27, the bushing assembly is preheated while the core 23 is vented to the atmosphere to condition the kraft paper dielectric layers 24. The tubular shroud with core 23 assembled therein is then subjected to a vacuum drying operation wherein a vacuum is drawn on the interior of housing 27 while the insulating core 23 is heated above the boiling point of water to vaporize the moisture in the kraft paper dielectric layers 24 and remove moisture from the core 23. As disclosed in the copending application of William H. Ridenour assigned to the assignee of this application, heating of individual bushings with the insulating core 23 assembled in the porcelain shroud 27 is much more effective in transferring heat into the insulating core 23 through the vacuum and in removing moisture from the insulating core 23 than when the insulating core is subjected to vacuum drying in an autoclave before it is assembled in the porcelain shroud in accordance with prior art methods of construction. Drawing a vacuum on the bushing shroud 27 with insulating core 23 assembled therein permits subjecting the insulating core 23 to a much higher degree of vacuum with available vacuum pumps and removes a considerably higher percentage of moisture from the core 23 than prior art methods of bushing construction.

After the vacuum drying operation, the interior of porcelain housing 27 is filled with a suitable dielectric liquid 44 such as mineral oil while vacuum is maintained thereon to vacuum impregnate the core 23. The vacuum is then removed, and the impregnated assembly is vented to permit atmospheric pressure to force the dielectric fluid 44 into openings and pores in the kraft paper layers 24 before the tubular housing is sealed.

It will be appreciated that the preferred embodiment eliminates the separate metallic grounding sleeve member and the separate metallic mounting flange member of prior art bushings as well as the gaskets where the upper and lower porcelain shells of prior art construction were joined to the ground sleeve and mounting flange and yet the bushing generates minimum radio influence voltage. Further, the disclosed construction substantially reduces manufacturing cost in that it eliminates the expense of shrinking a metallic ground sleeve onto the condenser core and of assembling and aligning the gaskets at the ends of the grounding sleeve as in prior art bushings.

The porcelain housing 27 and condenser core 23 are simple to manufacture and easy to assemble, and the disclosed contact springs 50 afford an easily assembled means for making electrical connections between the radially outer foil layer 25a of the condenser core 23 and the ground sleeve.

Figure 3:
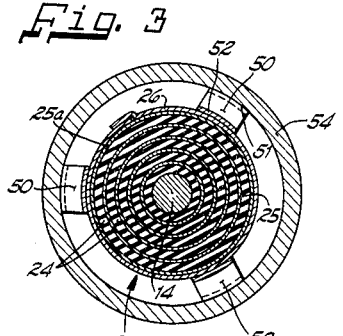
FIG. 3 is a view similar to FIG. 2 taken through an alternative embodiment of condenser bushing also having such improved means for making electrical connection between the outer foil layer and the ground sleeve and FIG. 4 is a partial vertical cross sectional view through the embodiment of FIG. 3.
Figure 4:
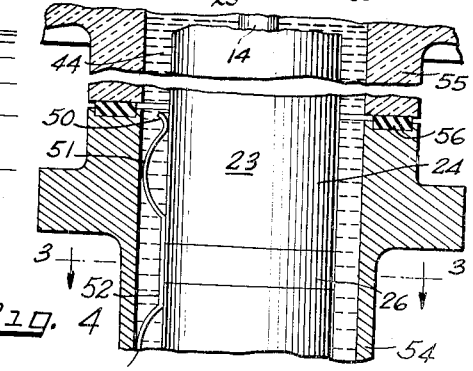

FIGS. 3 and 4 illustrate a condenser bushing wherein contact fingers 50 identical to those of the preferred embodiment and soldered to a metallic tab 26 in electrical contact with the outer foil layer 25a, provide high contact pressure against a tubular metallic ground sleeve member 54 the upper end of which abuts in conventional manner against a tubular ceramic upper shell 55 with a gasket 56 compressed therebetween. It will be apparent that in this embodiment also the resilient finger contacts 50 obviate the necessity of shrinking the ground sleeve in place over the insulating core 23.

While only a few embodiments of the invention have been illustrated and described, many modifications thereof will be apparent to those skilled in the art, and consequently it is intended in the appended claims to cover all such modifications and variations thereof which fall within the true spirit and scope of the invention.

I claim:

1. In a high voltage condenser bushing, in combination, a central conductor, a capacitor core having alternate layers of dielectric and conductive material surrounding said central conductor, a tubular housing surrounding said core and said central conductor including coaxial, abutting upper and lower ceramic shells having radially outward extending flanges at the ends thereof bonded together in abutting relation and affording a mounting flange for said bushing, dielectric fluid within said housing, a conductive coating on the interior periphery of said tubular housing and on the surface wherein said shells abut and on said mounting flange, said coating providing conductive ground sleeve means interior of said housing and also affording electrical connection from said ground sleeve means to said mounting flange, and means for making electrical connection between the radially outer of said conductive material layers of said core and said ground sleeve means.

2. A high voltage condenser bushing for electrical apparatus comprising, in combination, axial conducting means connected to top terminal means and extending through said bushing, a dielectric-fluid-permeable capacitor core having alternate layers of dielectric and conductive material surrounding said axial conducting means, the axial length of said conductive material layers increasing in a direction toward said conductive means, coaxial, abutting upper and lower tubular ceramic shells having radially outward extending flanges united at their abutting ends and defining a housing surrounding said core and said conducting means, said abutting flanges providing a mounting flange for said bushing, dielectric fluid within said housing impregnating said core, a plurality of petticoats on the exterior periphery of said upper ceramic shell, a metal coating on the interior peripheral surface and on the surface of said flange of said lower ceramic shell and also on the surface of said lower shell abutting against said upper ceramic shell, said metal coating defining ground sleeve means within said housing and affording electrical connection from said ground sleeve means to said metal-coated mounting flange, and means for electrically connecting the radially outer, conductive material layer of said core to said ground sleeve means.

3. A condenser bushing for conducting a high voltage lead through the apertured metallic casing wall of an electrical apparatus, comprising, in combination, a tubular housing extending through an aperture in said wall, an electrical conductor extending axially through said housing, a condenser core having alternate layers of dielectric and conducting material surrounding said conductor, said tubular housing including coaxial, abutting upper and lower ceramic shells having radially outward extending flanges bonded together in abutting relation at the ends thereof and of greater diameter than said aperture, a metal coating on said lower shell covering the inner peripheral surface thereof and the surface thereof abutting against said upper shell and the surface of said flange thereof, said flange on said lower shell resting upon said wall to support said bushing with the metal coating on said flange in electrical contact with said metallic wall, said metal coating providing conductive ground sleeve means at the interior of said casing and affording electrical connection between said ground sleeve means and said metallic wall, resilient metallic means between said core and the inner periphery of said housing for electrically connecting the radially outer layer of conductive material on said core to said ground sleeve means, and dielectric fluid within said housing impregnating said core.

4. In combination with a condenser bushing having an axial conductor, a condenser core including alternate layers of dielectric-fluid-permeable insulating material and conductive material surrounding said axial conductor, and a dielectric fluid impregnating said core; a housing including coaxial upper and lower tubular ceramic shells having abutting ends bonded together and surrounding said core and said axial conductor and defining a chamber for confining said dielectric fluid, a conductive coating on the interior peripheral surface of one of said members and on said abutting end surface thereof affording ground sleeve means interior of said housing and electrical connection between said ground sleeve means and the exterior of said housing, and means for electrically connecting said ground sleeve means to the radially outer conductive material layer of said core.

5. In a high voltage condenser bushing, in combination, a central conductor, a capacitor core comprising alternate layers of dielectric and conductive material surrounding said central conductor, a housing enclosing said central conductor and said core including coaxial, tubular upper and lower ceramic members having abutting ends united together, a radially outward extending flange on at least one of said members adjacent said abutting end thereof, a conductive coating on at least a portion of the interior peripheral surface and on said abutting end of one of said members, said coating affording ground sleeve means interior of said housing and electrical connection between said ground sleeve means and the exterior of said housing, and means interior of said housing for making electrical connection between said ground sleeve means and the radially outer conductive layer of said capacitor core.

6. In a high voltage condenser bushing having a low radio noise level, in combination, a central conductor extending therethrough, a condenser core including alternate layers of dielectric and conductive material surrounding said central conductor, a tubular ceramic housing surrounding said central conductor and said core and having a radially extending mounting flange on the exterior thereof, a metal coating on the surface of said flange, a dielectric insulating liquid within said housing impregnating said core, a metal coating on the interior periphery of said tubular housing affording ground sleeve means interior of said housing, means between said core and said ground sleeve coating for electrically connecting the radially outer of said layers of conductive material to said ground sleeve means, and means for providing electrical connection between said ground sleeve means interior of said housing and the metal coating on said mounting flange exterior of said housing.

7. In a high voltage condenser bushing having a central conductor, a condenser core including alternate layers of conductive and dielectric material surrounding said central conductor, a housing surrounding said core and said central conductor, said housing including a tubular upper ceramic shell and tubular metallic ground sleeve means coaxial with said shell, said coaxial ceramic shell and ground sleeve means surrounding said core and said central conductor, and dielectric liquid within said housing impregnating said core; the improvement comprising a thin metallic tab in electrical contact with the radially outer layer of said conductive material and being wrapped in more than one turn about said core and having its outer end secured to an inner layer and being exposed at the exterior of said core, and a plurality of resilient, metallic contact fingers secured in circumferentially spaced apart relation to said metallic tab and being compressed between said core and the interior peripheral surface of said tubular ground sleeve means and affording electrical contact between said radially outer layer of conductive material and said ground sleeve means.

References Cited in the file of this patent

UNITED STATES PATENTS

| | | |
|---|---|---|
| 1,255,667 | Thomson | Feb. 5, 1918 |
| 1,870,141 | Regerbis et al. | Aug. 2, 1932 |

FOREIGN PATENTS

| | | |
|---|---|---|
| 107,258 | Great Britain | June 28, 1917 |
| 270,420 | Great Britain | May 9, 1927 |